Oct. 12, 1965      W. S. ZAYDEL      3,211,496
SEAT BELT RETRACTOR WITH SAFETY LOCKING FEATURE
Filed Jan. 14, 1964
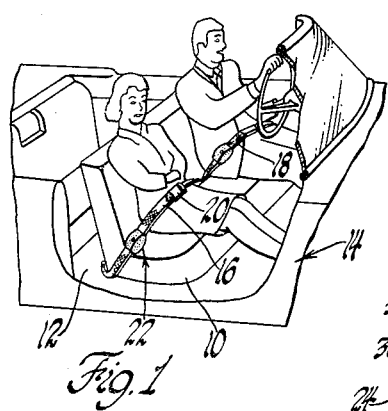
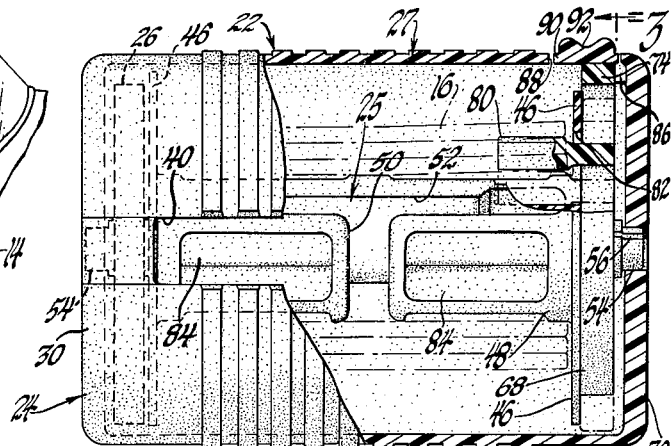
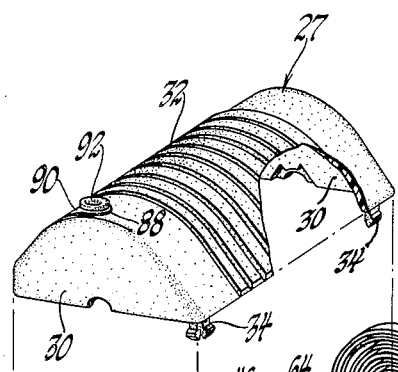
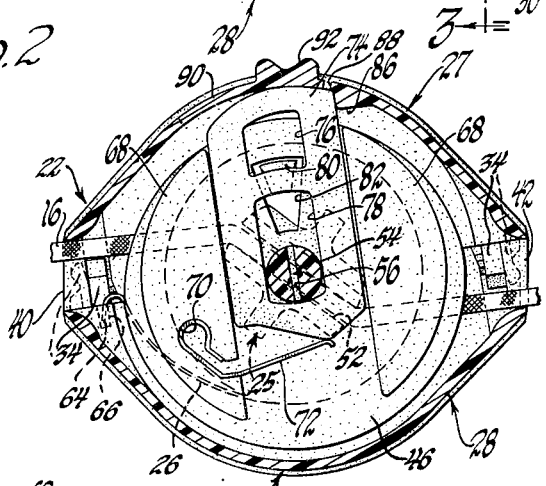
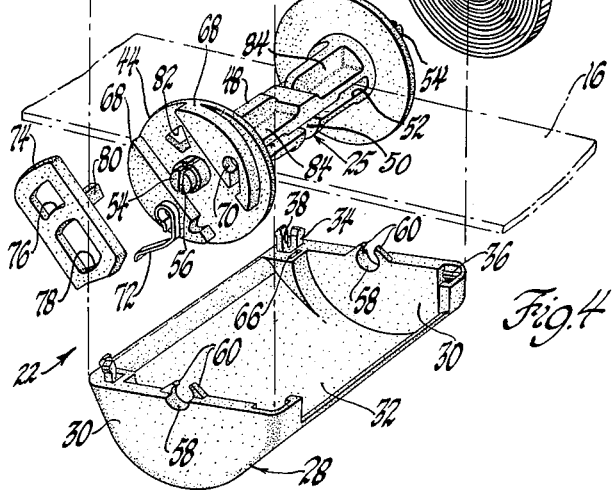
INVENTOR.
Wieslaw S. Zaydel
BY
Hugh L. Fisher
ATTORNEY

United States Patent Office 3,211,496
Patented Oct. 12, 1965

3,211,496
SEAT BELT RETRACTOR WITH SAFETY
LOCKING FEATURE
Wieslaw S. Zaydel, Hamtramck, Mich., assignor to General Motors Corporation, Detroit, Mich., a corporation of Delaware
Filed Jan. 14, 1964, Ser. No. 337,585
5 Claims. (Cl. 297—388)

This invention relates to seat belt retractors and more particularly to a seat belt retractor which can be easily and quickly coupled to the conventional seat belt assembly to retract the seat belt when not in use.

Recently, seat belts have gained wide acceptance with the motoring public as an important means of preventing or at least minimizing injuries to vehicle passengers during a collosion or sudden stopping of the vehicle. Such seat belts are usually formed by two straps of webbing, each secured at one end to the floor or frame of the vehicle and having cooperating buckle parts attached to the other end to secure the passenger in the seat.

One of the drawbacks associated with such seat belt assemblies is that when the belt is not in use, the free ends are usually found disarranged on the seat or on the floor where they may become soiled or caught in the vehicle door.

It has been suggested that a device be provided for automatically retracting the seat belt when not in use. One such device is disclosed in United States patent application Serial Number 324,001 assigned to the assignee of the present invention. The device disclosed in that application included a housing rotatably supporting a reel adapted to be adjustably coupled to the seat belt between the ends thereof. When the belt was fully withdrawn from the retractor, it extended directly from the free end thereof to the vehicle floor.

While the seat belt retractor disclosed in the aforementioned United States patent application adequately performed the function for which it was intended, there are certain drawbacks associated therewith which are obviated by the present invention. For example, if the seat belt has been previously adjusted for one of the larger members of the family, a somewhat smaller member may enter the vehicle and fasten the seat belt without realizing that the seat belt has not been fully withdrawn from the housing of the retractor. In that case one or two revolutions of seat belt may remain within the retractor. Should an accident occur, this slack would be taken up immediately thus allowing the passenger to move forward before the seat belt acts to restrain further movement. Since the seat belt may be somewhat loosely fastened about the occupant for purposes of comfort, this additional movement may prove injurious to the occupant. Additionally, when this seat belt has been fully extended and fastened around the occupant the resilient force exerted on the seat belt may prove irritable to the passenger.

In accordance with the present invention, a seat belt retractor is provided which may be adjustably coupled to the conventional seat belt assembly and which incorporates a safety locking feature which will relieve the normal spring tension of the retractor when placed in use and will also indicate to the passenger if the seat belt has been fully withdrawn from the retractor.

A more complete understanding of the present invention may be had from the following detailed description which should be read in conjunction with the drawings in which:

FIGURE 1 is a perspective view of a motor vehicle with parts broken away to show a seat belt mounted therein and in its extended position with the retractor coupled thereto between the ends thereof;

FIGURE 2 is an elevational view of the retractor with parts broken away and in section;
FIGURE 3 is a sectional view taken along lines 3—3 of FIGURE 2;
FIGURE 4 is an exploded view of the retractor.

Referring now to the drawings and initially to FIGURE 1, a seat 10 is secured to the floor 12 of a motor vehicle generally designated 14. A pair of seat belt assemblies are shown in their extended or operative positions and each comprises two straps 16 and 18 of webbing or similar material each having one end secured to the floor 12 with the opposite ends joined by suitable fastening means 20. A seat belt retractor generally indicated by the reference numeral 22 is shown coupled to each of the seat belt straps 16 and 18 between the ends thereof.

Referring now to FIGURES 2 through 4, the seat belt retractor 22 comprises a housing 24 which rotatably supports a reel 25. A spiral spring 26 is adapted to rotate the reel 25 in a direction to retract the belt strap 16 or 18 within the housing 24.

The housing 24 includes housing members 27 and 28, each having a pair of end walls 30 and an intermediate side wall 32. Each of the housing members 27 and 28 may be formed of a suitable plastic material and is provided with a pair of fastening prongs 34 and cooperating prong sockets 36. Each of the prongs 34 is slotted at 38 to provide flexible prong segments which flex upon entering the prong socket 36 to provide a detachable connection. Each of the side walls 32 has a portion cut away to provide slots 40 and 42 when the housing members 27 and 28 are joined together.

The reel 25 may be formed of a suitable plastic material and includes a pair of circular flanges 44 and 46 separated by a central shaft or barrel 48. The shaft 48 is provided with a transverse slot 50 communicating with a longitudinal slot 52 of sufficient size to accommodate the seat belt strap 16. Trunnions 54 extend from each of the flanges 44 and 46 and are slotted at 56 to impart resilience thereto. The trunnions 54 are adapted to be received in bearings 58 including a pair of integral tongues or tabs 60 extending from the end walls 30 of the housing member 28.

The spring 26 resides in a chamber defined by side walls 32, the flange 46 and one end wall 30 and has one end 62 coupled to a trunnion 54 with the other end 64 in engagement with slot 66 in the housing member 28. The spring 26 becomes tightly wound as the seat belt strap 16 is withdrawn from the retractor 22 so that upon release of the seat belt, the reel 25 will retract the seat belt strap 16 from opposite ends thereof into the retractor 22.

As more clearly shown in FIGURES 3 and 4, the flange 44 has integrally formed thereon a pair of guide members 68 defining a channel. One of the guide members 68 is provided with a spring seat 70 in which is mounted a small leaf spring 72 (shown disassembled in FIG. 4). A locking member 74 provided with generally rectangular shaped apertures 76 and 78 is adapted to be received between the guide members 68 and is provided with a laterally extending finger 80 which passes through a slot 82 in the flange 44 and overlies one of the recess portions 84 of the shaft 48. The lower generally V-shaped portion of the locking member 74 is in engagement with the leaf spring 72 which normally biases the locking member 74 toward a locking position in engagement with an abutment 86 integrally formed in the housing member 27. The finger 80 engages one side of the slot 82 to provide a stop for locking member 74. A generally U-shaped slot 88 is cut into the housing member 27 to provide a flexible release member 90 to which is attached a release button 92. The member 90 beneath the release button 92 is adapted to engage the upper portion of the locking member 74 to manually move the locking member against the bias of the leaf spring 72 to disengage the locking member 72 from the abutment 86.

To assemble the retractor 22, the spring 26 and the locking member 74 are first assembled with the reel 25. The reel 25 is then placed in the lower housing member 28 and rotated a suitable number of revolutions. The seat belt strap 16 is then placed in the slot 52 of the reel 25 and the upper housing member 27 is snapped into position. In this position where there are no revolutions of the belt strap 16 around the reel 25, the locking member 74 will be biased by the spring 72 into engagement with the abutment 86 of the upper housing member 27.

In order to retract the seat belt strap 16, the button 92 on the release member 90 is pressed inwardly to disengage the locking member 74 from the abutment 86. The spiral spring 26 will then urge the reel 25 in a clockwise or retracting direction. As the seat belt strap 16 is wound on the shaft 48, the first revolution of the strap 16 will engage the finger 80 drawing it inwardly toward the shaft 48 and maintaining the locking member 74 out of engagement with the abutment 86 as the seat belt strap is retracted. It will be apparent that when the seat belt strap 16 is fully extended, the finger 80 will be released and the reel will be locked by the locking member 74 engaging the abutment 86. At this point there will be no spring force on the seat belt strap 16 and the occupant will be aware of the release of spring tension indicating that the belt has been unwound from the reel 25.

It will be evident from the above description that the present invention provides a simple and economical seat belt retractor which will automatically lock when the seat belt has been withdrawn to its fully extended position to thereby relieve the inherent spring tension associated with the retractor and also to indicate to the user that the seat belt has been fully extended.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

I claim:

1. In combination with a safety seat belt mounted in a motor vehicle, a seat belt retractor adapted to be adjustably coupled to said seat belt, said retractor comprising a housing, a reel rotatably mounted in said housing and adapted to receive said seat belt between the ends thereof, resilient means for yieldingly urging said reel in a belt retracting direction, abutment means formed in said housing, locking means, drive means for coupling said reel with said locking means, additional resilient means for yieldingly urging said locking means in a direction to engage said abutment means to prevent rotation of said reel in a retracting direction, said locking means including means engageable by said belt to prevent locking of said reel until said belt has been full extended.

2. In combination with a safety seat belt having one end secured to a motor vehicle, a seat belt retractor comprising a substantially cylindrical housing, a reel rotatably mounted in said housing and having a longitudinal slot for receiving said seat belt between the ends thereof, said housing including a pair of opposed slots through which said seat belt is adapted to travel during extension and retraction thereof, said reel including a pair of flanges, spring means connected between said housing and said reel for yieldingly urging said reel in a retracting direction, a locking member, one of said flanges including drive means for coupling said reel with said locking member, an abutment formed in said housing, additional spring means yieldingly urging said locking means into engagement with said abutment means to prevent rotation of said reel in a retracting direction, said locking member adapted to be manually moved out of engagement with said abutment to allow said belt to be wound around said reel, said locking member including a projection engageable by said belt when said belt is wound on said reel to maintain said locking member out of engagement with said abutment while said seat belt is being retracted.

3. In combination with a safety seat belt mounted in a motor vehicle, a seat belt retractor adapted to be adjustably coupled to said seat belt, said retractor comprising a housing including a pair of end walls, a reel rotatably mounted in said end walls and including a pair of flanges extending from a central shaft, spring means for yieldingly urging said reel in a retracting direction, an abutment formed in said housing, a locking member, guide means formed in one of said flanges for receiving said locking member, additional spring means mounted in said one of said flanges and yieldingly urging said locking member into engagement with said abutment to prevent rotation of said reel in a retracting direction, said locking member adapted to be manually disengaged from said abutment, said locking member including a laterally extending projection adapted to be engaged by said belt during retraction thereof to maintain disengagement of said locking member from said abutment until said belt has been fully extended.

4. In combination with a safety seat belt mounted in a motor vehicle, a seat belt retractor adapted to be adjustably coupled to said seat belt, said retractor comprising a housing, a reel rotatably mounted in said housing and including a pair of flanges extending from a central shaft, spring means for yieldingly urging said reel in a retracting direction, an abutment formed in said housing, a locking member, drive means coupling said locking member to one of said flanges, additional spring means mounted in said one of said flanges and yieldingly urging said locking member into engagement with said abutment, said locking member adapted to be manually disengaged from said abutment to allow retraction of said belt, said locking member including a projection extending through one of said flanges in a direction parallel to said central shaft and adapted to be engaged by said belt during retraction thereof to maintain said locking member out of engagement with said abutment except when said belt is fully extended.

5. In combination with a safety seat belt mounted in a motor vehicle, a seat belt retractor adapted to be adjustably coupled to said seat belt, said retractor comprising a housing, a reel rotatably mounted in said housing and including a pair of circular flanges extending from a central shaft, said seat belt extending through said housing and said shaft, spring means connected between said shaft and said housing for yieldingly urging said reel in a direction to retract said belt within said housing, an abutment formed in said housing, a locking member, guide means formed in one of said flanges, said locking member adapted to be movably positioned in said guide means for movement in a direction transverse to said central shaft, additional spring means having one end connected to said one of said flanges and the other end in engagement with said locking member to yieldingly urge said locking member into engagement with said abutment to thereby prevent rotation of said reel in a retracting direction, said locking member including a projection extending through said one of said flanges in a direction parallel to said central shaft and adapted to be engaged by said belt during retraction thereof to maintain said locking member out of engagement with said abutment except when said belt is fully extended.

No references cited.

FRANK B. SHERRY, *Primary Examiner.*